(12) United States Patent
Wabnegger et al.

(10) Patent No.: US 9,882,359 B2
(45) Date of Patent: Jan. 30, 2018

(54) TEMPORARY TRANSFER BUS

(71) Applicant: QUANTA ASSOCIATES, LP, Houston, TX (US)

(72) Inventors: David Karl Wabnegger, Langley (CA); Daniel Neil O'Connell, Oliver (CA)

(73) Assignee: Quanta Associates, L.P., Houston, TX (US)

(*) Notice: Subject to any disclaimer, the term of this patent is extended or adjusted under 35 U.S.C. 154(b) by 330 days.

(21) Appl. No.: 14/692,480

(22) Filed: Apr. 21, 2015

(65) Prior Publication Data
US 2015/0303672 A1   Oct. 22, 2015

Related U.S. Application Data

(60) Provisional application No. 61/982,182, filed on Apr. 21, 2014.

(51) Int. Cl.
*H05K 1/02* (2006.01)
*H02G 1/02* (2006.01)
*H02G 7/05* (2006.01)

(52) U.S. Cl.
CPC ............... *H02G 1/02* (2013.01); *H02G 7/05* (2013.01)

(58) Field of Classification Search
CPC .. H02G 15/105; H02G 15/113; H02G 15/115; H02G 15/117; H02G 15/188; H02G 3/0431; H02G 3/0462; H02G 3/0493; H02G 3/08; H02G 3/081; H02G 3/12; H02G 3/128; H02G 3/16; H02G 3/386; H02G 3/388
See application file for complete search history.

(56) References Cited

U.S. PATENT DOCUMENTS

| 4,323,722 A * | 4/1982 | Winkelman | H02G 7/20 174/43 |
|---|---|---|---|
| 6,060,972 A | 5/2000 | Van Den Brink | |
| 6,630,638 B1 * | 10/2003 | Freeman | H02B 5/06 200/50.21 |
| 7,535,132 B2 | 5/2009 | Devine et al. | |

(Continued)

OTHER PUBLICATIONS

Lee W. Young, International Search Report and the Written Opinion of the International Searching Authority, or the Declaration, dated Jul. 22, 2015, 8 pages, ISA/US Commissioner for Patents, Alexandria, VA, United States.

*Primary Examiner* — Jared Fureman
*Assistant Examiner* — Esayas Yeshaw
(74) *Attorney, Agent, or Firm* — Oathout Law Firm; Mark A. Oathout

(57) ABSTRACT

The invention includes a method for transferring a power load between adjacent electrical conductors using a temporary transfer bus, and the transfer bus apparatus itself, wherein the transfer bus includes first and second conductive sections rigidly mounted to and separated by a rigid bus insulator, and a selectively operable transfer bus closing device adapted to selectively electrically connect the first and second conductive sections to each other, the method including suspending the first and second conductive sections from the adjacent conductors, whether directly or using suspension insulators, electrically connecting the conductive sections to the conductors, and closing the transfer bus closing device.

17 Claims, 8 Drawing Sheets

(56) References Cited

U.S. PATENT DOCUMENTS

| | | | |
|---|---|---|---|
| 7,732,708 B1* | 6/2010 | Peabody | H02G 7/20 |
| | | | 174/40 R |
| 8,471,416 B2 | 6/2013 | Barthold | |
| 8,505,878 B2 | 8/2013 | Barthold | |
| 2003/0156936 A1* | 8/2003 | Devine | H02G 1/04 |
| | | | 414/680 |
| 2005/0047044 A1 | 3/2005 | Nolden et al. | |
| 2010/0218988 A1* | 9/2010 | Lynch | H02G 7/00 |
| | | | 174/5 R |
| 2012/0205139 A1* | 8/2012 | Cotton | H02G 7/053 |
| | | | 174/162 |

* cited by examiner

TEMPORARY TRANSFER BUS

FIELD OF INVENTION

This invention relates to the field of transfer buses, and in particular to an improved temporary transfer bus, and a method of using same, to support a temporary transfer bus from existing conductors in a power line system.

BACKGROUND OF THE INVENTION

Applicant engages, amongst other activities, in the reconductoring of high voltage power lines without interrupting the service provided by the existing lines. In the Applicant's patent no. U.S. Pat. No. 7,535,132 for a Live Conductor Stringing and Splicing Method and Apparatus, there is described in one embodiment of that invention a method for reconductoring a high voltage power line that involves the relocating of an existing phase conductor to a temporary support structure adjacent to existing structure and then stringing of a new phase conductor on the existing support structure, whereby the new phase conductor is located between two dead ends near one of the existing phase conductors and the temporary support structure is located near the existing support structure. The power load of the existing phase conductor on the temporary support structure is then transferred to the new phase conductor using two temporarily installed transfer buses that are oriented generally laterally with respect to the existing phase conductors. The temporary transfer buses and the old phase conductor on the temporary support structure are removed.

The transfer bus described in the Applicant's previous patent no. U.S. Pat. No. 7,535,132 is comprised of a conductor with insulators connected to each end of the conductor. The insulators are installed on a transfer bus support structure. The transfer bus may include a flexible conductor or a rigid conductor suspended between the transfer bus support structures.

Prior art transfer buses and their use in prior art reconductoring methods are cumbersome to use, as they require the installation of two separate transfer buses, each requiring their own set of transfer bus support structures which may include temporary support structures installed in the ground or temporary support insulators installed on the support structures for the existing phase conductors to be worked upon. As such, the construction of temporary support structures for supporting each of the temporary transfer buses adds to the time, labour and materials required, increasing the overall cost of a reconductoring project and safety risk as it has to be installed above or below energized conductors. Thus, there is a need in the industry for an improved transfer bus that is safer and easier to install and uninstall, and which may be easily moved from one section of a reconductoring project to the next without requiring its own support structures.

SUMMARY OF THE INVENTION

The present invention is an improved temporary transfer bus for transferring a power load from one electrical conductor to another. The temporary transfer bus is adapted to transfer a power load from one live conductor to another conductor without interrupting the downstream supply of electricity transmitted through the conductors being worked upon. The present invention discloses an improved temporary transfer bus which, in one embodiment, is adapted to be supported on insulators suspended from existing conductors, thereby eliminating the need for support structures to be constructed for supporting the transfer bus itself and therefore improving the safety and portability of the temporary transfer bus from one location to another on a reconductoring project.

The improved temporary transfer bus disclosed in this application includes at least a first conductive section and a second conductive section manufactured of substantially rigid materials, each of which are elongate and having a distal end and a proximal end. In one embodiment the first and second conductive sections are aligned so as to be substantially colinear. Preferably, each of the first and second conductive sections are manufactured of a strong and lightweight material capable of conducting electricity; an example of such material, not intending to be limiting in any way, is aluminum. The transfer bus also includes at least one insulator that is located between the first and second conductive sections, in one embodiment arranged in a substantially co-linear relationship with respect to the first and second conductive sections. An example of such an insulator, not intending to be limiting in any way, includes a polymer post insulator rated for use on an electrical transmission system for example at 230 kV or 345 kV. The improved transfer bus also includes one or more connection points on each of the first and second conductive sections of the transfer bus, each connection point adapted for temporarily connecting one end of a jumper cable or other conductive section, for the purpose of providing an electrical connection between the first and second conductive sections of the transfer bus across the insulator of the transfer bus, or alternatively for providing an electrical connection between one of the conductive sections of the transfer bus and a phase conductor.

The electrical connection points on the transfer bus may be for example comprised of a cylindrically shaped bar, manufactured of a metal or other conductive material that is bent into an approximately U-shape and welded to the transfer bus conductive sections. In another embodiment, the connection points may be comprised of tabs, manufactured of a metal or other conductive material that are welded or otherwise electrically conductively mounted to the conductive sections of the transfer bus. The tabs may further be provided with a plurality of bolt holes, for the bolting a jumper cable to a conductive section of the transfer bus.

In another embodiment, a connection point may be comprised of a plate, manufactured of a metal or other conductive material that are welded to each end of the conductive sections of the transfer bus and which are further provided with a plurality of bolt holes, for the bolting of an end of a separate, conductive section to another conductive section of the transfer bus. Further these connection points are used to connect one end of the conductive section to the insulator separating each conductive section of the transfer bus.

In a preferred embodiment of the present invention, the electrical connection points on each of the first and second conductive sections of the transfer bus may be adapted to each receive one end of a first jumper cable and one end of a second jumper cable, wherein the distal end of each of the jumper cables that is, those ends not connected to the transfer bus, may be connected to a switch or to a circuit breaker, such that the switch or circuit breaker may be operated from an open position to a closed position to complete the electrical connection between the two conductive sections of the transfer bus across the insulator of the transfer bus, thereby establishing an electrical connection between the two conductive sections of the transfer bus.

The total length of the transfer bus is adapted to coincide with the generally lateral distance between the two or more phase conductors being worked upon during a reconductoring procedure. In a preferred embodiment, not intended to be limiting the total length of the transfer bus is, such that the transfer bus spans at least the generally lateral distance between two phases, plus an additional two to four feet of length on either end of the transfer bus to account for variances in the lateral distance between the two phase conductors being worked upon.

In one aspect, not intended to be limiting, the invention may be characterized as a method of using a temporary transfer bus to transfer a power load between adjacent first and second conductors, including: (a) providing rigid first and second conductive sections rigidly mounted to, and separated by, a rigid bus insulator; (b) suspending the first and second conductive sections from the adjacent first and second conductors respectively; (c) providing a selectively operable transfer bus closing device adapted to selectively electrically connect the first and second conductive sections to each other.

The method may further include electrically connecting the conductive sections to the conductors and closing the closing device across the bus insulator so as to transfer the power load between the first and second conductors. The method may further include mounting first and second suspension insulators between the first and second conductors and the first and second conductive sections respectively and mounting distal ends of the first and second conductive sections to, respectively, lower ends of the first and second suspension insulators, and electrically connecting the distal ends to the first and second conductors. The transfer bus closing device may include an elongate conductive member, mounted at opposite ends thereof to the first and second conductive sections, wherein the transfer bus closing device may be chosen from the group including: an electrically conductive metallic member, a bus jumper cable.

The method may further include providing at least first and second jumper cables and electrically connecting the distal ends of the first and second conductive sections to, respectively, the first and second conductors, and further comprises electrically connecting the distal end of the first conductive section to the first conductor using the first jumper cable, and electrically connecting the distal end of the second conductive section to the second conductor using the second jumper cable. In one embodiment the first and second jumper cables may be each a pair of jumper cables, wherein each pair of jumper cables has upper and lower ends, and wherein the lower ends are attached to the distal ends of the respective first and second bus conductive sections and wherein the upper ends are electrically connected to the respective first and second conductors, and wherein the upper ends of each pair of jumper cables are separated along the respective first or second conductor to stabilize the transfer bus suspended below the first and second conductors.

The invention may also be characterized, in a further aspect, as temporary transfer bus to transfer a power load between adjacent first and second conductors wherein the transfer bus includes rigid first and second conductive sections rigidly mounted to, and separated by, a rigid bus insulator, and a selectively operable transfer bus closing device selectively operable in electrical contact with the first and second conductive sections, wherein said conductive sections are adapted to be suspended from the first and second conductors, and wherein distal ends of the conductive sections are electrically connected to the first and second conductors, and wherein the closing device is adapted to be closed across the bus insulator to transfer the power load between the first and second conductors.

In one embodiment, not intended to be limiting, the transfer bus closing device includes an elongate member, mounted at opposite ends thereof to the first and second conductive sections.

The transfer bus closing device may be chosen from the group including: an electrically conductive metallic member, a bus jumper cable.

The transfer bus may further include at least first and second jumper cables, wherein the first jumper cable electrically connects a distal end of the first conductive section to the first conductor, and the second jumper cable electrically connects a distal end of the second conductive section to the second conductor.

The first and second jumper cables each may be a pair of jumper cables each may be a pair of jumper cables, wherein each pair of jumper cables has upper and lower ends, and wherein the lower ends are adapted to be attached to the distal ends of the respective first and second conductive sections and wherein the upper ends are adapted to be electrically connected to the respective first and second conductors, and wherein, when said electrically connected, the upper ends of each pair of jumper cables are separated along the respective first or second conductor to stabilize the transfer bus when suspended below the first and second conductors.

DETAILED DESCRIPTION OF EMBODIMENTS OF THE INVENTION

An improved temporary transfer bus is provided to transfer the power load from an energized phase conductor to another phase conductor in an electrical transmission system. The improved temporary transfer bus is suspended from existing phase conductors, such that the temporary transfer bus does not require its own support structures. The use of the improved temporary transfer bus increases the worker safety as it is simpler and easier to install, provides more working clearance from energized phase conductors and allows the making of electrical connection to be made in a more clear and therefore safer area. The use of the improved temporary transfer bus during a reconductoring project may result in the reduction of the amount of time, labour and equipment required in using transfer buses to transfer a power load from an energized phase conductor to another phase conductor, because the improved temporary transfer bus disclosed herein may be connected to the phase conductors being worked on without the requirement of having to first construct support structures to support the transfer bus in a position proximate to the phase conductors being worked on. Additionally, the absence of the need for separate support structures for the transfer bus provides greater flexibility in the placement of a transfer bus along a particular transmission line, which may also preferably reduce the time, labour and cost associated with constructing and moving the transfer buses along the length of a particular phase conductor being worked upon. The transfer bus can also be suspended directly from the phase conductors, that is, without insulators.

In a preferred embodiment of the invention, the temporary transfer bus is comprised of two or more lengths of substantially rigid conductive sections which are separated by an insulator, wherein the two or more conductive sections and the insulator are, in a preferred embodiment, arranged in a substantially co-linear relationship with respect to each other, although this is not intended to be limiting as other than co-linear arrangements would also work. The distal ends of the transfer bus structure, which are distal from the insulator interspersed between the two or more conductive sections of the transfer bus, are each adapted to be suspended from the existing phase conductors directly, or from insulators that are themselves suspended from the existing phase conductors being worked on.

Figure 1:
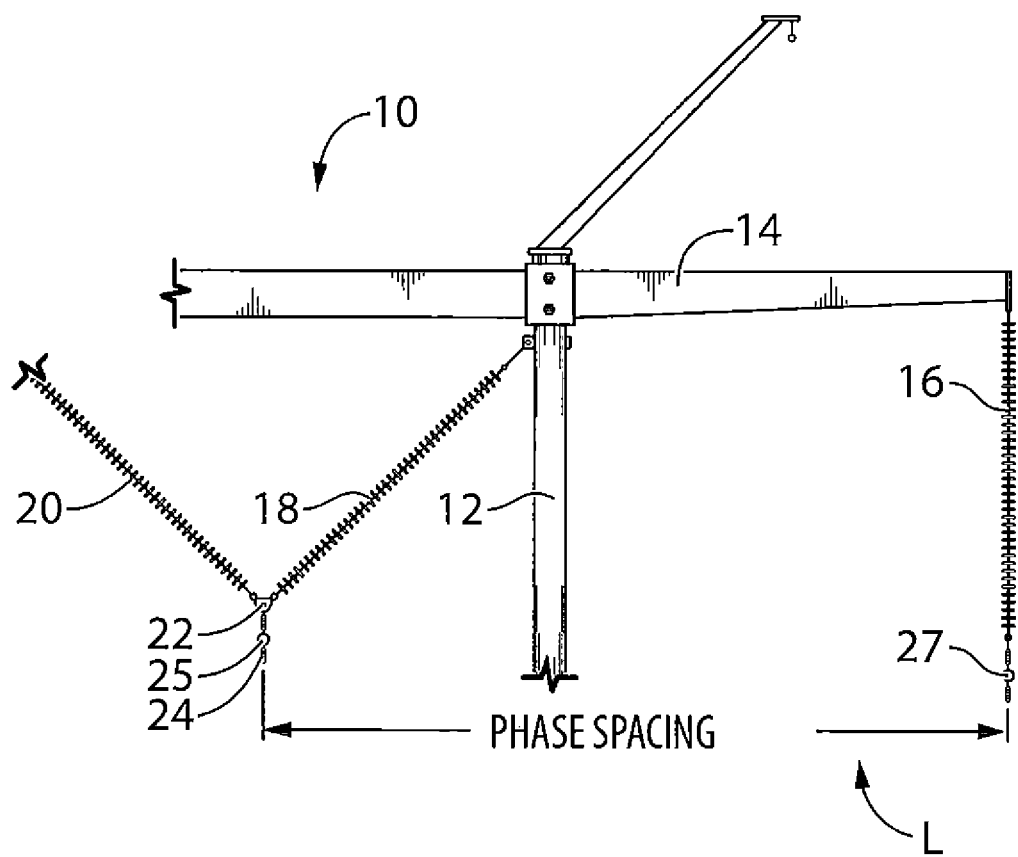
FIG. 1 is a partially cut away illustration of an overhead transmission line structure, showing two phase conductors spaced apart and each phase conductor suspended from one or more insulators.
Figure 5:
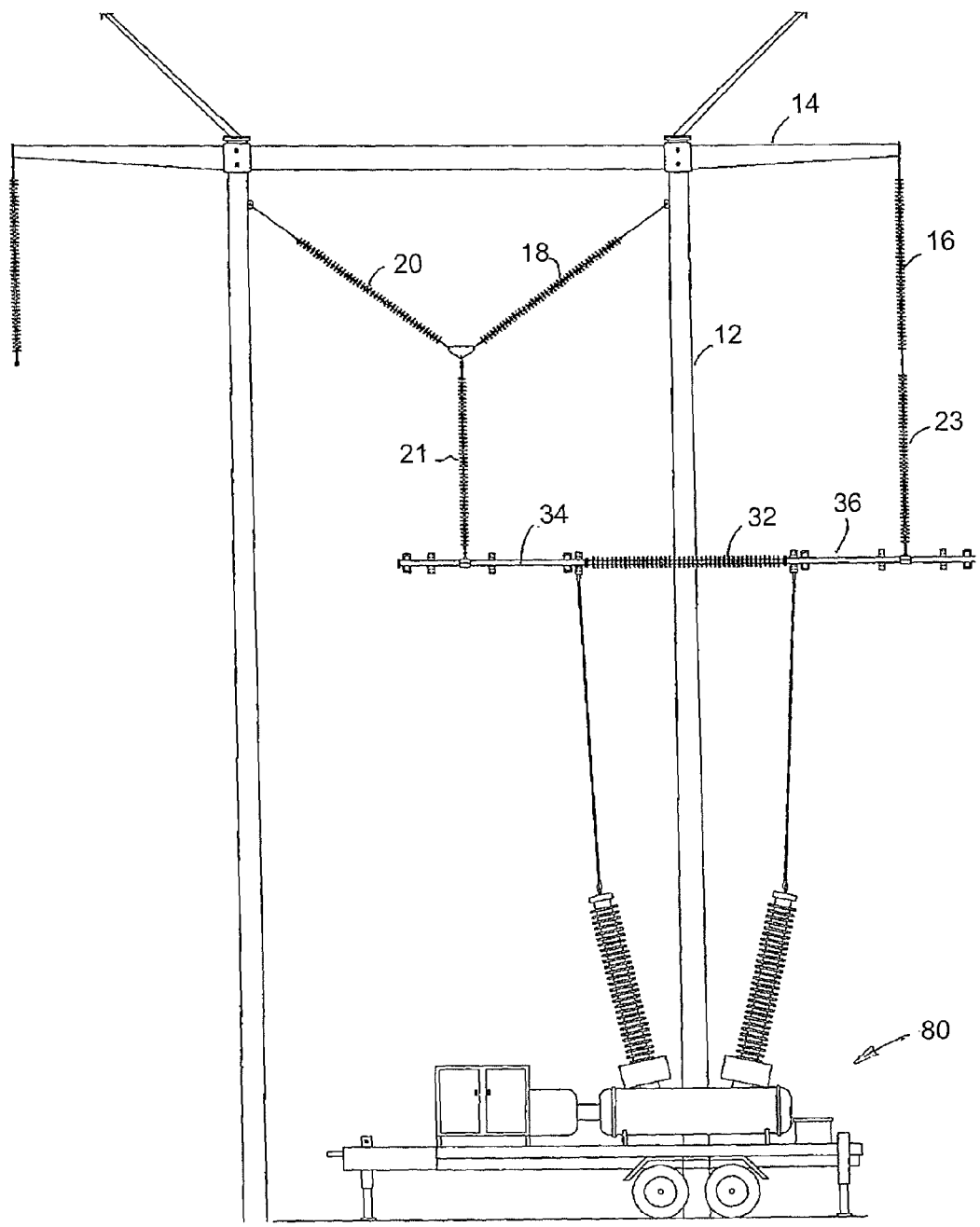
FIG. 5 is a transfer bus according to an embodiment employing a portable circuit breaker.

FIG. 1 illustrates a portion of an overhead transmission line structure showing the cross section of a first phase conductor 25 spaced apart from the cross section of a second phase conductor 27 by a phase conductor distance L. Distance L is defined as the generally lateral distance between the elongate phase conductors 25 and 27. For example, without intending to be limiting in any way, the distance L between two phase conductors, which is determined by line voltage and design, may be for example 28' for 345 kV. A support structure 10 may include a vertical post 12 supporting a horizontal cross arm 14. As will be appreciated by a person skilled in the art, there are many different configurations of support structures that may be used to support phase conductors. For example, as can been seen in FIG. 1, a phase conductor 27 may be vertically suspended from a cross arm 14 by means of a first suspension insulator 16. As another example, a second phase conductor 25 may be suspended from a support structure 10 by means of a suspension insulator 18 that may be supported on the vertical post 12 of the support structure 10. The phase conductor 25 may be additionally supported by a second suspension insulator 20. Insulator 20 may be suspended from cross arm 14 or from another vertical support post such as seen in FIG. 5. The phase conductor 25 may be further suspended from a yoke 22, supported by the suspension insulators 18 and 20 in a "V" configuration.

Figure 2:
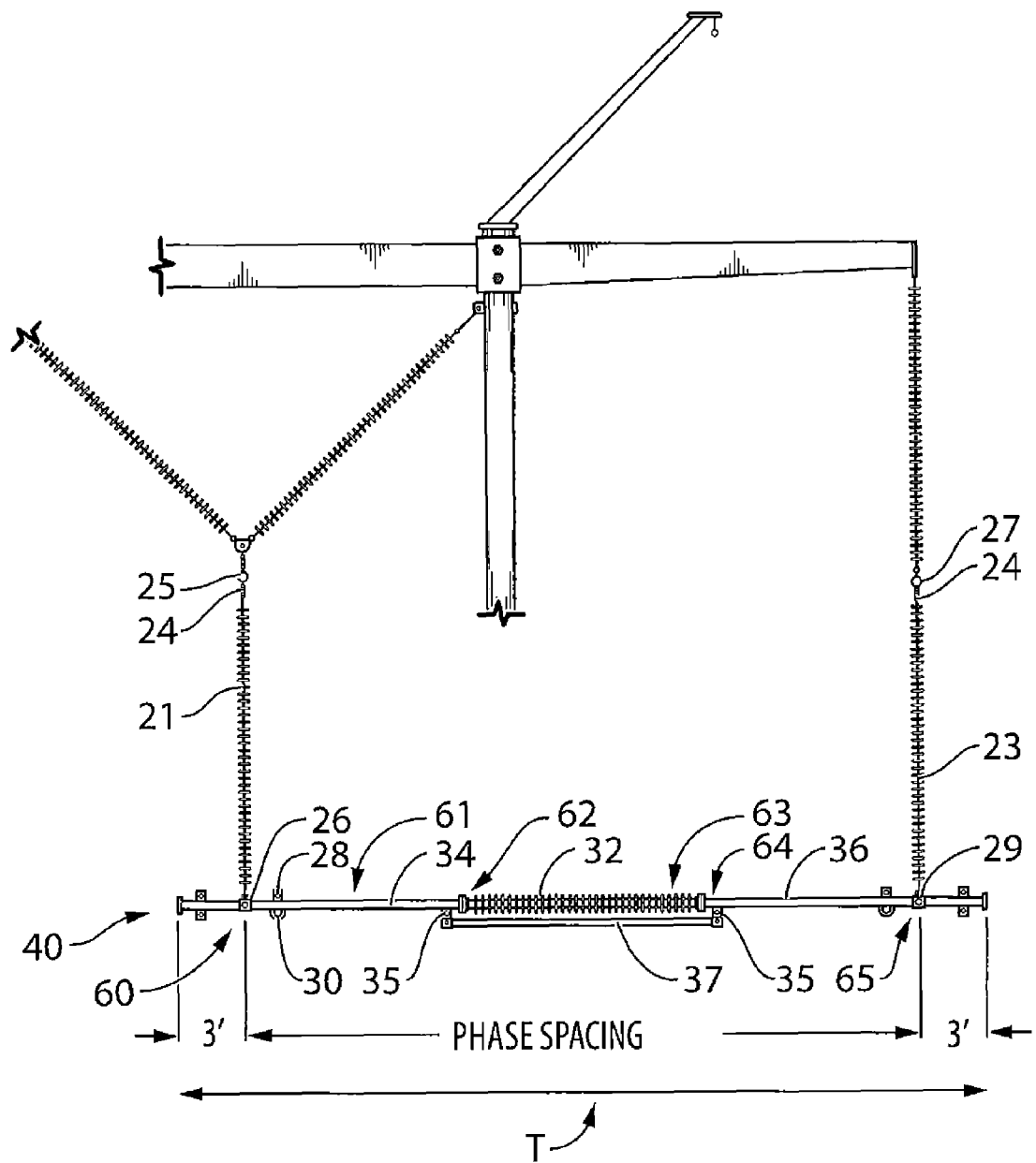
FIG. 2 is a front elevation view of one embodiment of a temporary transfer bus, mounted to the transmission line structure of FIG. 1.

An embodiment of an improved temporary transfer bus is illustrated in FIG. 2. The overall length T of a transfer bus 40 may range, for example without intending to be limiting, a total of 34 feet and six inches to 36 feet and six inches, which provides for an overall length of a transfer bus that spans the entire distance L, for example 28 feet, six inches, between the two phase conductors 25 and 27 being worked on a during a reconductoring project, and extends beyond the distance L by two or four feet on each end of the transfer bus. Thus in the embodiment illustrated in FIG. 2, the length of the temporary transfer bus 40 extends for example three feet at each end of the transfer bus beyond the distance L between the phase conductors. As stated above, transfer bus length L is determined by voltage and design, for example 28 feet for 345 kV or 18 feet for 230 kV.

The transfer bus 40 is comprised of a first bus conductive section 34 and a second bus conductive section 36. Conductive sections 34, 36 are substantially rigid conductors that are preferably manufactured of a strong and lightweight material that conducts electricity. An example of such material, without intending to be limiting, is aluminium. It will be understood by a person skilled in the art that other strong and lightweight materials which are capable of conducting electricity and which are substantially rigid may also be utilized to manufacture the first and second bus conductive sections 34, 36. The first bus conductive section 34 has a distal end 60 that is distal to a bus insulator 32 located between the first bus conductive section 34 and the second bus conductive section 36. Conductive section 34 has a proximal end 61 that is proximal to the bus insulator 32. Similarly, the second bus conductive section 36 has a distal end 65 that is distal to the bus insulator 32, and a proximal end 64 that is proximal to the bus insulator 32. The bus insulator 32 is connected at a first end 62 to the proximal end 61 of the first bus conductive section 34. A second end 63 of the bus insulator 32 is connected to the proximal end 64 of the second bus conductive section 36.

The distal end 60 of the first bus conductive section 34 is provided with a first bus clamp 26 that is mounted to the first bus conductive section 34. Similarly, a second bus clamp 29 is mounted on the distal end 65 of the second bus conductive section 36. The first and second bus clamps 26, 29 may be bolted respectively to the first and second bus conductive sections 34, 36, or mounted by other mounting means known to a person skilled in the art. In the embodiments of FIGS. 1-6, suspension insulator 21 is suspended from the first phase conductor 25 by means of a suspension clamp 24, or other suspension means known to a person skilled in the art. The distal end of the suspension insulator 21, distal from the first phase conductor 25, is attached to the distal end 60 of the first bus conductive section 34 by means of the first bus clamp 26. Similarly, the distal end 65 of the second bus conductive section 36 is suspended from the second phase conductor 27 by means of a suspension clamp 24 at the upper end of a suspension insulator 23. The opposite, lower end of the suspension insulator 23 is attached to the distal end 65 of the second bus conductive section 36 by means of bus clamp 29.

A plurality of connection points are provided on transfer bus 40 which allow the connection of jumper cables, switches or circuit breakers to the first bus conductive section 34 and the second bus conductive section 36. For example, tab connectors 28 are comprised of a flat body manufactured of an electrically conducting material, such as aluminium for example, mounted to the first and second bus conductive sections 34, 36 by welding or other electrically conductive mounting means. The body of the tab connector 28 may be provided with one or more bolt holes for the connection of a jumper cable.

Loop-shaped connectors 30 may also be provided, which include a length of conductive material formed into a loop and welded or otherwise electrically conductively mounted to the conductive sections 34 and 36. Again, the loop connector 30 is manufactured of an electrically conducting material, for example aluminium or other appropriate electrically conductive material. The loop connector 30 is adapted to receive an end of a jumper cable 38.

In one embodiment, for example the embodiment illustrated in FIG. 2, a pair of tab connectors 35 are welded or otherwise mounted to each of the first bus conductive section 34 and the second bus conductive section 36 adjacent the opposite ends of insulator 32 so that each of the tab connectors 35 are located proximately to the bus insulator 32. The tab connectors 35 may be used to selectively and removably mount a rigid conductive electrically bar 37 across insulator 32 by bolts or other mounting means commonly known in the art. Tab connectors 35 are also referred to herein as one form of selectively operable transfer bus closing device. When conductive bar 37 is mounted to each of the tab connectors 35, bar 37 thereby provides an electrical connection between the first bus conductive section 34 and the second bus conductive section 36 across the bus insulator 32. Opening the electrical connection provided by bar 37, by dismounting at least one end of bar 37 from the corresponding connectors 35, disconnects the electrical connection between the first bus conductive section 34 and the second bus conductive section 36. A power load may be transferred from phase conductor 25 to phase conductor 27 when conductive bar 37 is mounted to each of the pair of connector tabs 35 to thereby provide an electrical connection between the first bus conductive section 34 and the second bus conductive section 36, bypassing the bus insulator 32.

Figure 3:
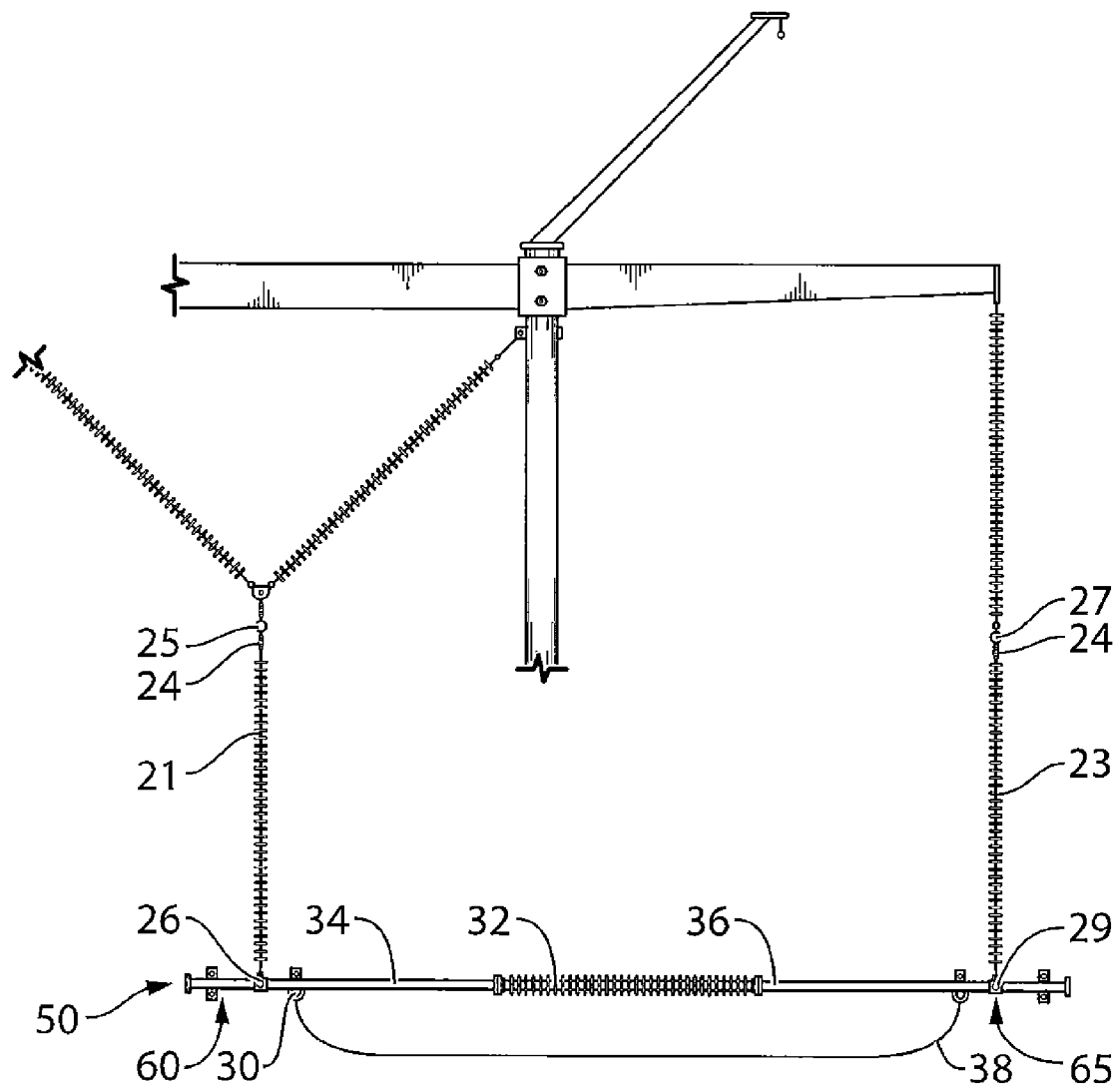
FIG. 3 is a front elevation view of a further embodiment of the temporary transfer bus of FIG. 2.

In the further embodiment of FIG. 3, which is not intended to be limiting, transfer bus 50 includes, as before, a first bus conductive section 34, a second bus conductive section 36, and a bus insulator 32 mounted between the proximal end 61 of the first bus conductive section 34 and the proximal end 64 of the second bus conductive section 36. The bus conductive sections 34, 36 and the bus insulator 32 are arranged in a co-linear relationship with respect to one another. The distal end 60 of the first bus conductive section 34 is suspended from the first phase conductor 25 by means of a suspension clamp 24 which suspends suspension insulator 21 from the first phase conductor 25. The other end of suspension insulator 21 is connected to a first bus clamp 26 which clamps the transfer bus 50 to the fourth suspension insulator 21. Similarly, the distal end 65 of the second bus conductive section 36 is suspended from second phase conductor 27 by suspension clamp 24 which connects the second phase conductor 27 to the upper end of suspension insulator 23. The opposite lower end of suspension insulator 23 is attached to the transfer bus 50 by second bus clamp 29. Loop connectors 30 are provided on each of the first bus conductive sections 34, 36. Each of the loop connectors 30 are adapted to selectively and removably receive one end of a jumper cable 38 in electrical connection therewith.

A jumper cable 38 may be used to provide a temporary electrical connection across insulator 32 between the first bus conductive section 34 and the second bus conductive section 36. That is, when the ends of jumper cable 38 are attached to a corresponding loop connector 30, respectively on each of the first bus conductive section 34 and the second bus conductive section 36, an electrical connection is formed between the first bus conductive section 34 and the second bus conductive section 36. Similarly, when one end of the jumper cable 38 is disconnected from one of the loop connectors 30, or when jumper cable 38 is entirely removed, the electrical connection between the first bus conductive section 34 and the second bus conductive section 36 is broken.

Each of the first bus conductive section 34 and the second bus conductive section 36 may be provided with a plurality of electrically conductive connectors which may include loop connectors 30, tab connectors 28 or other types of connectors adapted to receive an end of a rigid or flexible conductor, such as for example the rigid conductive bar 37, or such as the jumper cable 38 or other types of rigid or flexible conductors known to a person skilled in the art.

Figure 4:
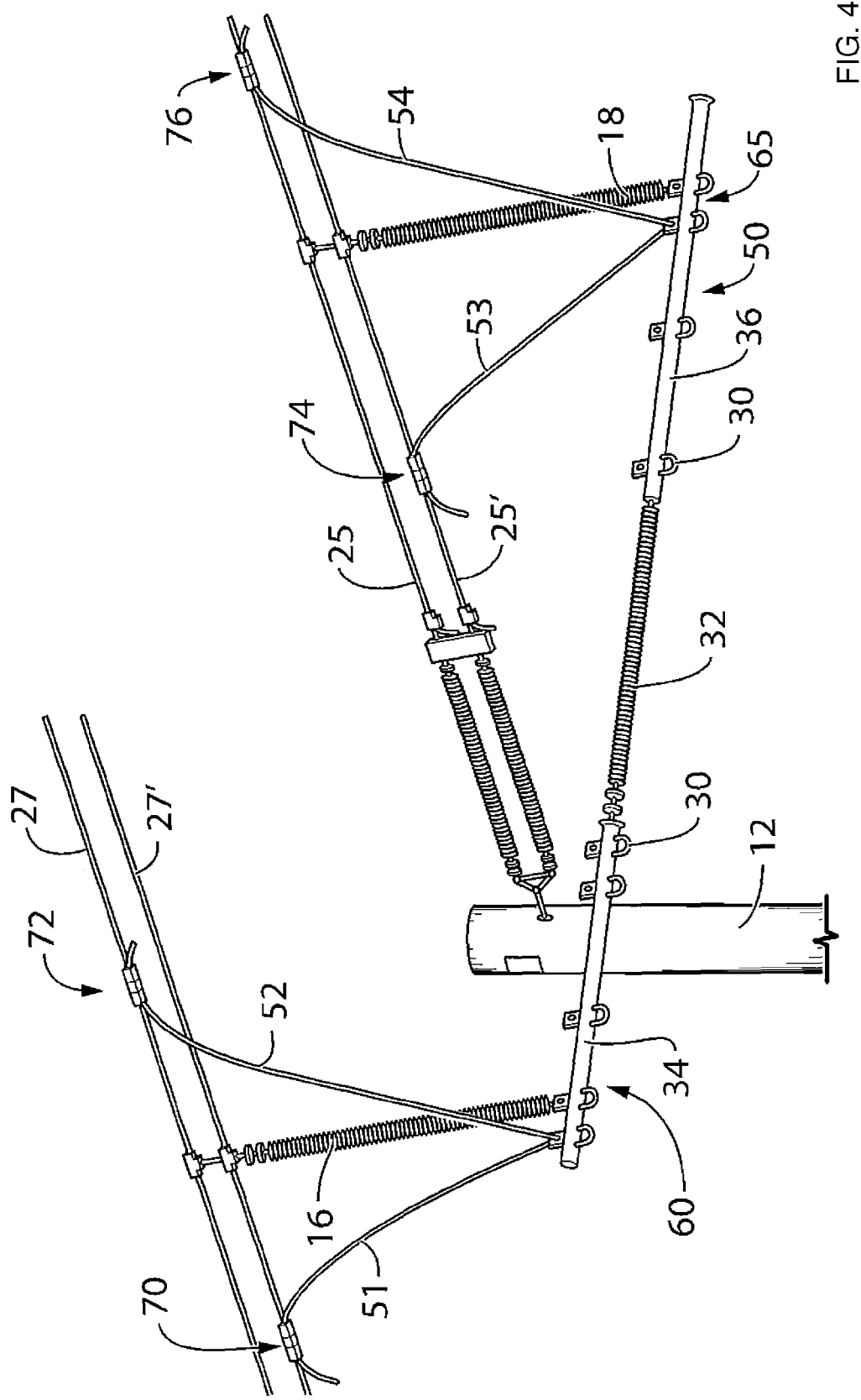
FIG. 4 is a perspective view of a further embodiment of a temporary transfer bus, in accordance with the present invention.

When it is desired to establish an electrical connection between a first phase conductor 25 and second phase conductor 27, such electrical connection may be established through a transfer bus 50 as illustrated by way of example in FIG. 4, by means of additional jumper cables 51, 52, 53 and 54. For example, with reference to FIG. 4, jumper cables 51, 52 may be utilized to provide an electrical connection between the phase conductors 27, 27' and a first bus conductive section 34 of a transfer bus 50, by attaching one end of each of jumper cables 51, 52 to the distal end 60 of the bus conductive section 34, and the opposite ends of each of the jumper cables 51, 52 to the phase conductors 27, 27'. Similarly, jumper cables 53, 54 may be utilized to provide an electrical connection between the phase conductors 25, 25' and a second bus conductive section 36 of the transfer bus 50, by attaching one end of each of jumper cables 53, 54 to the distal end 65 of the second bus conductive section 36, and the opposite ends of each of the jumper cables 53, 54 to the phase conductors 25, 25'.

In addition to providing an electrical connection between the first bus conductive section 34 and the phase conductors 27, 27' and another electrical connection between the second bus conductive section 36 and the phase conductors 25, 25', the jumper cables 51, 52, 53, 54 may be advantageously arranged to provide additional stability to the suspended transfer bus 50 whereby undesirable swaying movement of the transfer bus 50 in a longitudinal direction relative to the phase conductors 25, 25' and 27, 27', which may be caused by wind or other forces acting on the suspended transfer bus 50, may be reduced or eliminated. For example, as illustrated in FIG. 4, the location 70 along the phase conductor 27' at which one end of the jumper cable 51 is connected to the phase conductor 27' may be longitudinally spaced apart from the location 72 along the phase conductor 27 at which one end of the jumper cable 52 is connected to the phase conductor 27. Similarly, the location 74 at which one end of the jumper cable 53 is attached to the phase conductor 25' may be longitudinally spaced apart from the location 76 at which one end of the jumper cable 54 is attached to the phase conductor 25. When it is desired to transfer for example the power load from the phase conductors 25, 25' to the phase conductors 27, 27', the electrical connection between the first bus conductive section 34 and the second bus conductive section 36 may be accomplished by means of the use of hot sticks (not shown) to manipulate and connect/disconnect jumper cables 38, or in an alternative embodiment, by means of a rigid conductive bar 37.

FIG. 5 illustrates the use of a portable circuit breaker 80, for example trailer mounted, although this is not intended to be limiting, for making the electrical connection across insulator 32 between conductive sections 34,36 of the transfer bus. Portable circuit breaker 80 is positioned below the transfer bus and electrically connected to each side of the transfer bus. Again because of the location of the transfer bus afforded by the present invention, the portable circuit breaker may be positioned and used to energize or de-energize more safely than could be done in the past.

Figure 6:
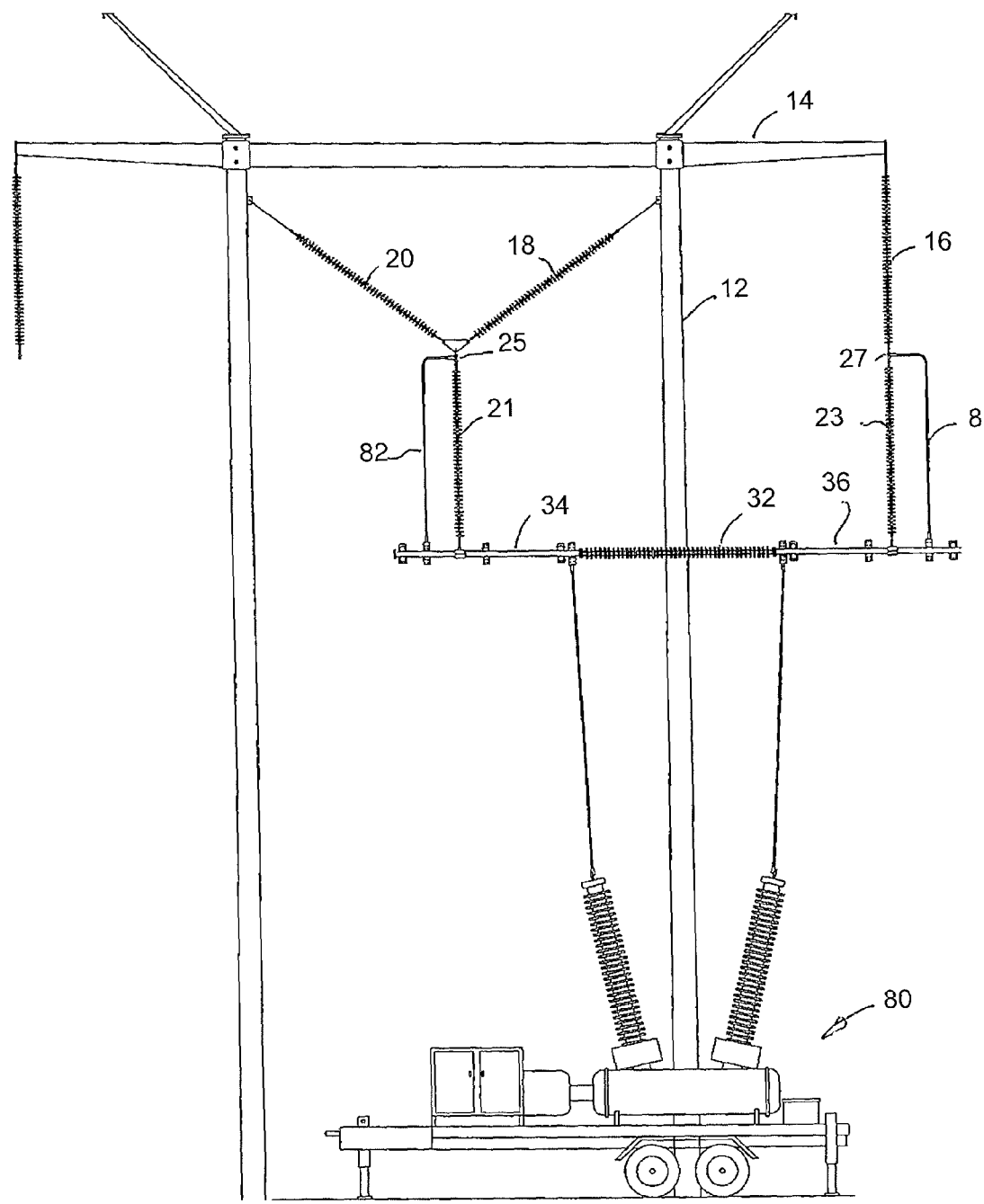
FIG. 6 is the view of FIG. 5 showing the installation of a pair of jumper cables.

As seen in FIG. 6, with portable circuit breaker 80 electrically connected to the transfer bus as seen in FIG. 5, jumpers 82 may be installed from the phase conductors 25,27, down each side of the transfer bus, for example adjacent suspension insulators 21, 23, so as to energize down to the top of the circuit breaker bushing. Although jumpers 82 are installed energized, the location of the transfer bus afforded by the present invention (and the location of the phase conductors) provides ease of use and improved safety in the use of energized jumpers.

Figure 7:
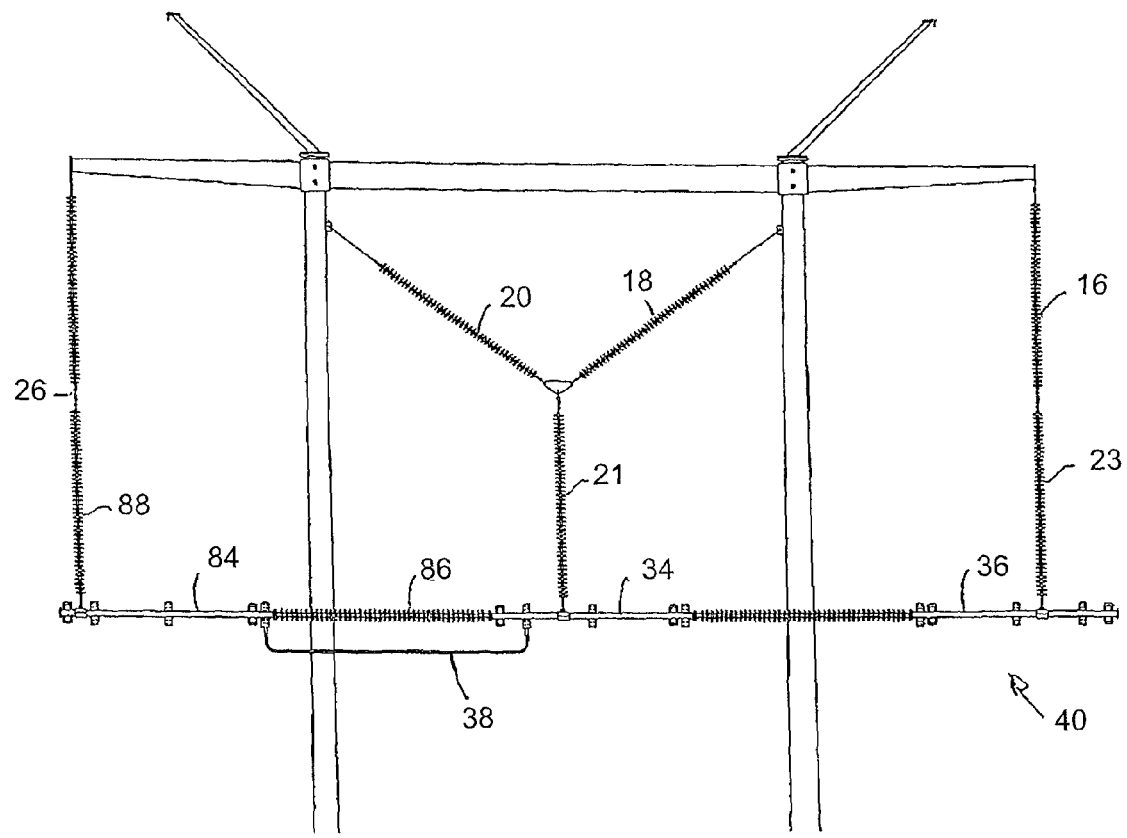
FIG. 7 is a transfer bus according to an embodiment wherein the transfer bus is extended to a third phase conductor.

In other embodiments, for example as shown in FIG. 7, a third bus conductive section 84 may be provided, co-linear with conductive section 34 and having a rigid bus insulator 86 therebetween so as to extend the transfer bus 40 to a third phase conductor 26. Conductive section 84 is suspended from phase conductor 26, for example by suspension insulator 88. A rigid electrical connector such as a selectively operable bar or a flexible connector such as flexible jumper cable 38 electrically connects the bus conductive sections 84 and 34. As shown by way of example, electrical connection may also be provided by other types of selectively operable transfer bus closing devices, for an example, a switch such as employing the rigid bar 37, or a portable circuit breaker 80. The selection of either a jumper cable and hot sticks, a switch, a circuit breaker to provide for the electrical connection across an insulator between adjacent conductive sections will depend on the voltage of the phase conductor being worked upon and the mass of the phase conductor to which the power load is to be transferred as well be known to one skilled in the art.

Figure 8:
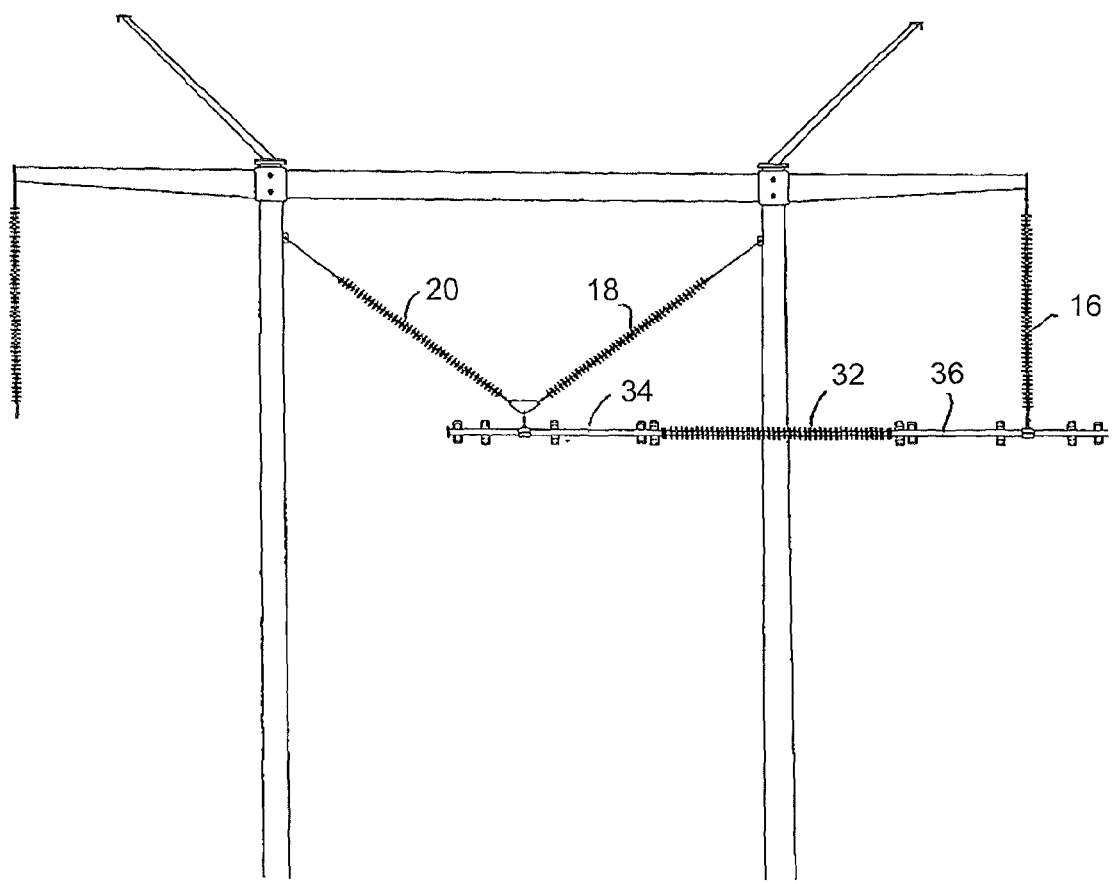
FIG. 8 is a transfer bus according to an embodiment wherein the conductive sections are suspended directly from the phase conductors.

As seen in FIG. 8, in some cases as would be known to one skilled in the art, suspension insulators, such as suspension insulators 21, 23, 86, are not required so that the conductive sections 34, 36, 84 and the corresponding bus insulators 32, 86 as the case may be are suspended directly from the corresponding phase conductors 25, 26, 27. In these embodiments the corresponding bus insulators 32, 86 provide the necessary electrically insulated separation of the phase conductors.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of using a temporary transfer bus to transfer a power load between adjacent first and second conductors comprising:
   a. providing rigid first and second conductive sections rigidly mounted to, and separated by, a rigid bus insulator,
   b. suspending the first and second conductive sections from the adjacent first and second conductors respectively,
   c. providing a selectively operable transfer bus closing device adapted to selectively electrically connect the first and second conductive sections to each other.

2. The method of claim 1 further comprising electrically connecting the conductive sections to the conductors and closing the closing device across the bus insulator so as to transfer the power load between the first and second conductors.

3. The method of claim 1 further comprising mounting first and second suspension insulators between the first and second conductors and the first and second conductive sections respectively and mounting distal ends of the first and second conductive sections to, respectively, lower ends of the first and second suspension insulators, electrically connecting the distal ends to the first and second conductors.

4. The method of claim 1 wherein said transfer bus closing device includes an elongate conductive member, mounted at opposite ends thereof to the first and second conductive sections.

5. The method of claim 2 wherein the transfer bus closing device is chosen from the group including electrically conductive metallic member, a bus jumper cable.

6. The method of claim 3 further comprising providing at least first and second jumper cables and electrically connecting the distal ends of the first and second conductive sections to, respectively, the first and second conductors, further comprising electrically connecting the distal end of the first conductive section to the first conductor using the first jumper cable, and electrically connecting the distal end of the second conductive section to the second conductor using the second jumper cable.

7. The method of claim 6 wherein said first and second jumper cables are each a pair of jumper cables.

8. The method of claim 7 wherein each said pair of jumper cables has upper and lower ends, and wherein the lower ends are attached to the distal ends of the respective first and second conductive sections and wherein the upper ends are electrically connected to the respective first and second conductors, and wherein the upper ends of each pair of jumper cables are separated along the respective first or second conductor to stabilize the transfer bus suspended below the first and second conductors.

9. A temporary transfer bus to transfer a power load between adjacent first and second conductors comprising rigid first and second conductive sections rigidly mounted to, and separated by, a rigid bus insulator, and a selectively operable transfer bus closing device selectively operable in electrical contact with the first and second conductive sections, wherein said conductive sections are adapted to be suspended from the first and second conductors, and wherein distal ends of the conductive sections are electrically connected to the first and second conductors, and wherein the closing device is adapted to be closed across the bus insulator to transfer the power load between the first and second conductors.

10. The apparatus of claim 9 wherein said transfer bus closing device includes an elongate member, mounted at opposite ends thereof to the first and second conductive sections.

11. The apparatus of claim 10 wherein the transfer bus closing device is chosen from the group including electrically conductive metallic member, a bus jumper cable.

12. The apparatus of claim 9 further comprising at least first and second jumper cables, wherein the first jumper cable electrically connects a distal end of the first conductive section to the first conductor, and the second jumper cable electrically connects a distal end of the second conductive section to the second conductor.

13. The apparatus of claim 12 wherein said first and second jumper cables are each a pair of jumper cables.

14. The apparatus of claim 13 wherein each said pair of jumper cables has upper and lower ends, and wherein the lower ends are adapted to be attached to the distal ends of the respective first and second conductive sections and wherein the upper ends are adapted to be electrically connected to the respective first and second conductors, and wherein, when said electrically connected, the upper ends of each pair of jumper cables are separated along the respective first or second conductor to stabilize the transfer bus when suspended below the first and second conductors.

15. A method of using a temporary transfer bus to transfer a power load between adjacent first and second conductors comprising:
   a. providing first and second rigid conductive sections rigidly mounted to, and separated by, a rigid bus insulator,
   b. vertically suspending first and second suspension insulators from the adjacent first and second conductors,
   c. mounting distal ends of the first and second rigid conductive sections to the lower ends of the first and second suspension insulators respectively, and electrically connecting the distal ends of the first and second conductive sections to the first and second conductors respectively,
   d. providing a selectively operable transfer bus closing device in electrical contact with the first and second conductive sections ; and, electrically closing the closing device across the bus insulator so as to transfer the load,
   e. providing at least first and second jumper cables and wherein the step of electrically connecting the distal ends of the first and second conductive sections to, respectively, the first and second conductors, further comprises electrically connecting the distal end of the first conductive section to the first conductor using the first jumper cable, and electrically connecting the distal end of the second conductive section to the second conductor using the second jumper cable, and wherein said first and second jumper cables are each a pair of jumper cables, and wherein each said pair of jumper cables has upper and lower ends, and attaching the lower ends to the distal ends of the respective first and second conductive sections and electrically connecting the upper ends to the respective first and second conductors, and separating the upper ends of each pair of jumper cables along the respective first or second conductor to stabilize the transfer bus suspended below the first and second conductors.

16. The method of claim 15 wherein said transfer bus closing device includes an elongate member, mounted at opposite ends thereof to the first and second conductive sections.

17. The method of claim 16 wherein the transfer bus closing device is chosen from the group including electrically conductive metallic member, a bus jumper cable.

* * * * *